US009065944B2

(12) United States Patent
Asai

(10) Patent No.: US 9,065,944 B2
(45) Date of Patent: Jun. 23, 2015

(54) COMPUTER-READABLE STORAGE MEDIUM STORING INSTRUCTIONS FOR INFORMATION PROCESSING DEVICE, INFORMATION PROCESSING DEVICE, AND METHOD FOR CONTROLLING INFORMATION PROCESSING DEVICE CAPABLE OF SETTING DEVICES TO EXECUTE VARIOUS TYPES OF PROCESSING

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/307,730

(22) Filed: Jun. 18, 2014

(65) Prior Publication Data

US 2014/0368878 A1 Dec. 18, 2014

(30) Foreign Application Priority Data

Jun. 18, 2013 (JP) .................................. 2013-127803

(51) Int. Cl.
*H04N 1/00* (2006.01)

(52) U.S. Cl.
CPC ....... *H04N 1/00408* (2013.01); *H04N 1/00129* (2013.01); *H04N 1/0044* (2013.01); *H04N 2201/0094* (2013.01); *H04N 2201/0072* (2013.01); *H04N 2201/0055* (2013.01); *H04N 2201/0096* (2013.01); *H04N 2201/0089* (2013.01)

(58) Field of Classification Search
USPC ......................................................... 358/1.15
See application file for complete search history.

(56) References Cited

U.S. PATENT DOCUMENTS

| 7,804,608 | B2 | 9/2010 | Shirai et al. | |
|---|---|---|---|---|
| 2005/0018236 | A1 | 1/2005 | Shirai et al. | |
| 2009/0036056 | A1* | 2/2009 | Oshima et al. | 455/41.3 |
| 2009/0103124 | A1* | 4/2009 | Kimura et al. | 358/1.15 |
| 2011/0069341 | A1* | 3/2011 | Kim et al. | 358/1.15 |

FOREIGN PATENT DOCUMENTS

JP 2005-044080 A 2/2005

* cited by examiner

*Primary Examiner* — Ngon Nguyen
(74) *Attorney, Agent, or Firm* — Banner & Witcoff, Ltd.

(57) ABSTRACT

An information processing device may be configured to send print information to a printing device connected with a network. The information processing device may store identifying information for identifying the printing device. The information processing device may execute a print preview display processing of displaying a print preview image showing a print preview using the print information. The information processing device may send the print information to the printing device according to a user input. The information processing device may execute first connection confirmation processing of confirming that connection confirmation information has been received. The connection confirmation processing may be performed according to a first condition for starting the print preview display processing being satisfied. The information processing device may display a reception confirmation image in a case that it is confirmed that the connection confirmation information has been received.

22 Claims, 11 Drawing Sheets

| | SSID | Model Number | IP Address | Default Device Flag |
|---|---|---|---|---|
| First Wireless Communication | SSID-1 (Access Point 500) | Ink-MFP1 | 211.9.36.148 | ON |
| | | Ink-MFP2 | 211.9.36.154 | — |
| | SSID-2 (Access Point 501) | Ink-MFP3 | 192.168.100.101 | — |
| | | Laser1 | 192.168.100.102 | ON |

| | Model Number | MAC Address | Default Device Flag |
|---|---|---|---|
| Second Wireless Communication | Ink-MFP1 | MAC Address 1 | — |
| | Ink-MFP2 | MAC Address 2 | — |
| | Ink-MFP3 | MAC Address 3 | On |
| | Laser1 | MAC Address 4 | — |

COMPUTER-READABLE STORAGE MEDIUM STORING INSTRUCTIONS FOR INFORMATION PROCESSING DEVICE, INFORMATION PROCESSING DEVICE, AND METHOD FOR CONTROLLING INFORMATION PROCESSING DEVICE CAPABLE OF SETTING DEVICES TO EXECUTE VARIOUS TYPES OF PROCESSING

CROSS-REFERENCE TO RELATED APPLICATIONS

This application claims priority to Japanese Patent Application No. 2013-127803, filed on Jun. 18, 2013, the contents of which are hereby incorporated by reference into the present application.

TECHNICAL FIELD

This application relates to a non-transitory computer-readable storage medium storing instructions for an information processing device, an information, processing device and a method of controlling an information processing device capable of setting devices to execute various types of processing.

DESCRIPTION OF RELATED ART

Conventionally, in a computer such as a PC, a printing environment of selecting the user's intended printer among a plurality of printers connected in a network environment and sending printing instructions to the selected printer is now in widespread use. In order to perform printing with the intended printer, the user installs a driver corresponding to that printer type. When a driver is installed, the IP address of the printer that is used via the driver is stored in the PC. Moreover, known is a technology for the user to register the most often-used printer as the default printer in the PC. Normally, the user inputs, through the PC, printing instructions to the printer that is registered as the default printer,

SUMMARY

A technology is known that sends a print instruction from a portable terminal to a device such as a printer. Moreover, a technology is known for registering a device that is frequently used by a user as a default device in the portable terminal. Since the portable terminal is portable, it may not always be in a state of being able to communicate with the default device. Thus, it is necessary to perform connection confirmation regarding whether the portable terminal can communicate with the default device. Nevertheless, since the connection confirmation takes time, there are cases that the user must wait during the processing time of the connection confirmation, and this may impair the convenience in use.

In one aspect of the teachings disclosed herein, a non-transitory computer-readable storage medium storing instructions for an information processing device may be provided. The information processing device may be configured to send print information to a printing device connected with a network. The information processing device may comprise: a communication interface configured to communicate with the network; a processor coupled to the communication interface; and a storage unit. The instructions, when executed by the processor, may cause the information processing device to perform: storing, in the storage unit, identifying information for identifying a printing device connected with the network. The instructions may cause the information processing device to perform: executing print preview display processing of displaying, on a display unit, a print preview image showing a print preview using the print information. The instructions may cause the information processing device to perform: sending, after the print preview display processing is executed, the print information to the printing device via the communication interface according to a user input instructing to send the print information. The instructions may cause the information processing device to perform: executing first connection confirmation processing of confirming that connection confirmation information, sent by the printing device identified by the identifying information stored in the storage unit, has been received via the communication interface, the first connection confirmation processing being performed according to a first condition for starting the print preview display processing being satisfied. The instructions may cause the information processing device to perform: displaying, on the display unit, a reception confirmation image corresponding to the confirmation of reception of the connection confirmation information in a case that it is confirmed that the connection confirmation information sent by the communication destination printing device has been received.

BRIEF DESCRIPTION OF DRAWINGS

FIG. 7 shows an example of a table TB1;

FIG. 8 shows an example of a table TB2;

EMBODIMENT

Figure 1:
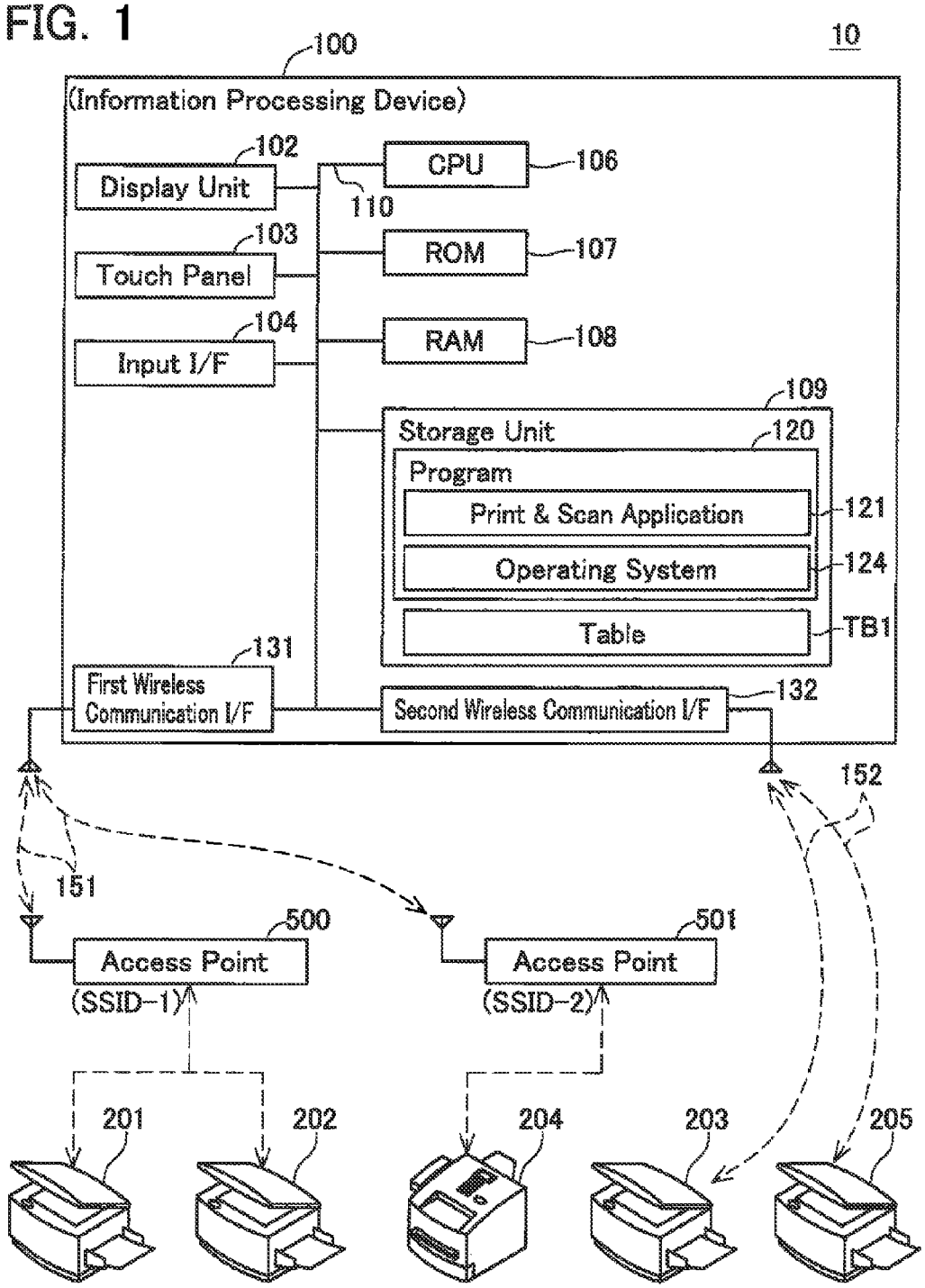
FIG. 1 shows the configuration of a network.

FIG. 1 is a block diagram showing the configuration of a network 10. The network 10 comprises an information processing device 100, inkjet MFPs 201 to 203 and 205, a color laser printer 204, and access points 500 and 501. The information processing device 100 communicates with the access point 500 or 501 based on a first wireless communication 151 via a first wireless communication I/F 131. As an example of the first wireless communication 151, there is Wi-Fi (registered trademark of Wi-Fi Alliance) as one type of wireless LAN. The inkjet MFPs 201 and 202 are connected to the access point 500. The color laser printer 204 is connected to the access point 501. In other words, the information processing device 100 and the inkjet MFPs 201 and 202 are communicable via the access point 500. The information processing device 100 and the color laser printer 204 are communicable via the access point 501. Here, MFP is a Multifunction Peripheral comprising a printing function, a scanning function, and a copying function. Moreover, the information processing device 100 communicates with each of the inkjet MFPs 203 and 205 based on a second wireless communication 152 via a second wireless communication I/F 132. The second wireless communication 152 is a communication capable of directly communicating with the communication-target device without going through an access point. As an example of the second wireless communication 152, there is Bluetooth (registered trademark of Bluetooth SIG, Inc.), The information processing device 100 can execute a print & scan application 121, and send a print request to the inkjet MFPs 201 to 203, and 205 and the color laser printer 204 via a first wireless communication 151 or the second wireless communication 152. Thai is, the information processing device 100 can utilize the inkjet MFPs 201 to 203, and 205 and the color laser printer 204 via the first wireless communication 151 or the second wireless communication 152.

The information processing device 100 is, for example, a portable device such as a portable phone or a portable terminal device. The information processing device 100 comprises a display unit 102, a touch panel 103, an input I/F 104, a first wireless communication I/F 131, a second wireless communication I/F 132, a CPU 106, a RAM 108, a storage unit 109 and the like, and these components are connected to each other via an I/O port 110.

The display unit 102 receives an image signal that is output from the CPU 106, and displays an image based on the received image signal. As the display unit 102, used may be, for example, an LCD or an organic EL panel. The touch panel 103 is formed from a transparent member, and disposed so as to cover the surface of the display unit 102. The touch panel 103 detects the position that was touched with the user's finger or the like, and outputs the detected position information to the CPU 106. In the ensuing explanation, the reception of the position information, which was output from the touch panel 103, by the CPU 106 is referred to as the CPU 106 accepting the touch, or other similar expressions. The input I/F 104 is, for example, an operation button. The information processing device 100 is activated when the input I/F 104 is pressed.

The CPU 106 executes the programs stored in the storage unit 109. The RAM 108 temporarily stores information that is required for the processing to be performed by the CPU 106. The storage unit 109 may also be a computer-readable storage medium. A computer-readable storage medium is, for example, a non-transitory medium such as a RUM, a RAM, a flash memory, and a hard disk. Electric signals that deliver programs that are downloaded from an online server or the like do not correspond to a non-transitory medium. The storage unit 109 may also be configured by combining a flash memory, a hard disk (referred to as HDD), and a buffer provided in the CPU 106. The storage unit 109 can store image data, document data and the like. Although details will be described later, identification information of a default device is stored therein. The storage unit 109 additionally stores information such as a processing execution reservation flag, print setting differentiation information, and communication path change information, which are described later.

The storage unit 109 stores a program 120. The program 120 includes a print & scan application 121, an operating system 124, and the like. The CPU 106 executes processing according to the program 120 stored in the storage unit 109. In the ensuing explanation, the CPU 106 to execute programs such as the print & scan application 121 and the operating system 124 is sometimes simply referred to by the program name. For example, the indication of "print & scan application 121" may mean "the CPU 106 that executes the print & scan application 121". The print & scan application 121 is an application for causing the CPU 106 to execute processing for causing the inkjet MFP 200 and the like to perform print processing and the like. The operating system 124 is a program for providing the basic functions that are commonly used by the print & scan application 121 and the like. The operating system 124 includes a program for causing the first wireless communication I/F 131 to execute the first wireless communication 151, and a program for causing the second wireless communication VF 132 to execute the second wireless communication 152.

Moreover, the storage unit 109 stores tables TB1 and TB2. The table TB1 is a table for storing the default device when the first wireless communication 151 is used. Moreover, the table TB2 is a table for storing the default device when the second wireless communication 152 is used. The default device is a device that is selected in advance as the device to execute printing among a plurality of devices.

FIG. 7 shows an example of the table TB1. The table TB1 stores, as information relating to the device, an SSID 600, identifying information 603, and a default device flag 608. The SSID 600 is information for identifying the access point of the communication destination. The identifying information 603 is information for identifying the respective devices that are communicable via an access point, and is stored in correspondence with the SSID 600 which identifies the access point. The identifying information 603 comprises a model number 601 and an IP address 602. The model number 601 is information for identifying the type of each device. In the first embodiment, the model number 601 of the respective devices of the inkjet MFPs 201 to 203 is "Ink-MFP1", "Ink-MFP2", and "Ink-MFP3". The model number 601 of the device of the color laser printer 204 is "Laser1". The IP address 602 is an identification number that is assigned to the respective devices and used in the communication. The default device flag 608 is information indicating the default device. The device in which the default device flag 608 is "ON" is the device that has been set as the default device. The table TB1 is edited when the print button B1 is touched on the print preview screen described later, and when the setting is changed on the setting screen.

FIG. 8 shows an example of the table TB2. The table TB2 stores, as information related to the devices, identifying information 703 and a default device flag 708. The identifying information 703 comprises a model number 701 and a MAC address 702. The MAC address 702 is a physical address that is unique to the respective devices. Since contents of the model number 701 and the default device flag 708 are similar to the contents described earlier, the description thereof will be omitted. Further the table TB2 is also edited when a print button B1 in a print preview screen to be described later is touched, or when settings are changed in a setting screen.

Some features relating to the description in the present specification are hereby explained. In the present specification, the description "the CPU 106 of the information processing device 100 receives various types of information" includes the technical meaning "the CPU 106 of the information processing device 100 acquires various types of information via the first wireless communication I/F 131 or the second wireless communication IX 132". Further, the description "the CPU 106 of the information processing device 100 sends various types of information" includes the technical meaning "the CPU 106 of the information processing device 100 outputs various types of information via the first wireless communication IN 131 or the second wireless communication I/F 132".

Here, a definition of the words "data" and "information" will be explained. In the present specification, "information" is used as a concept superordinate to "data". Consequently, "A data" may be rephrased as "A information". Further, "B data", which is duplicated or converted from "A data", is "A information" as long as it is used having a meaning equal to the "A data".

<Operation of Print & Scan Application 121>

Figure 2:
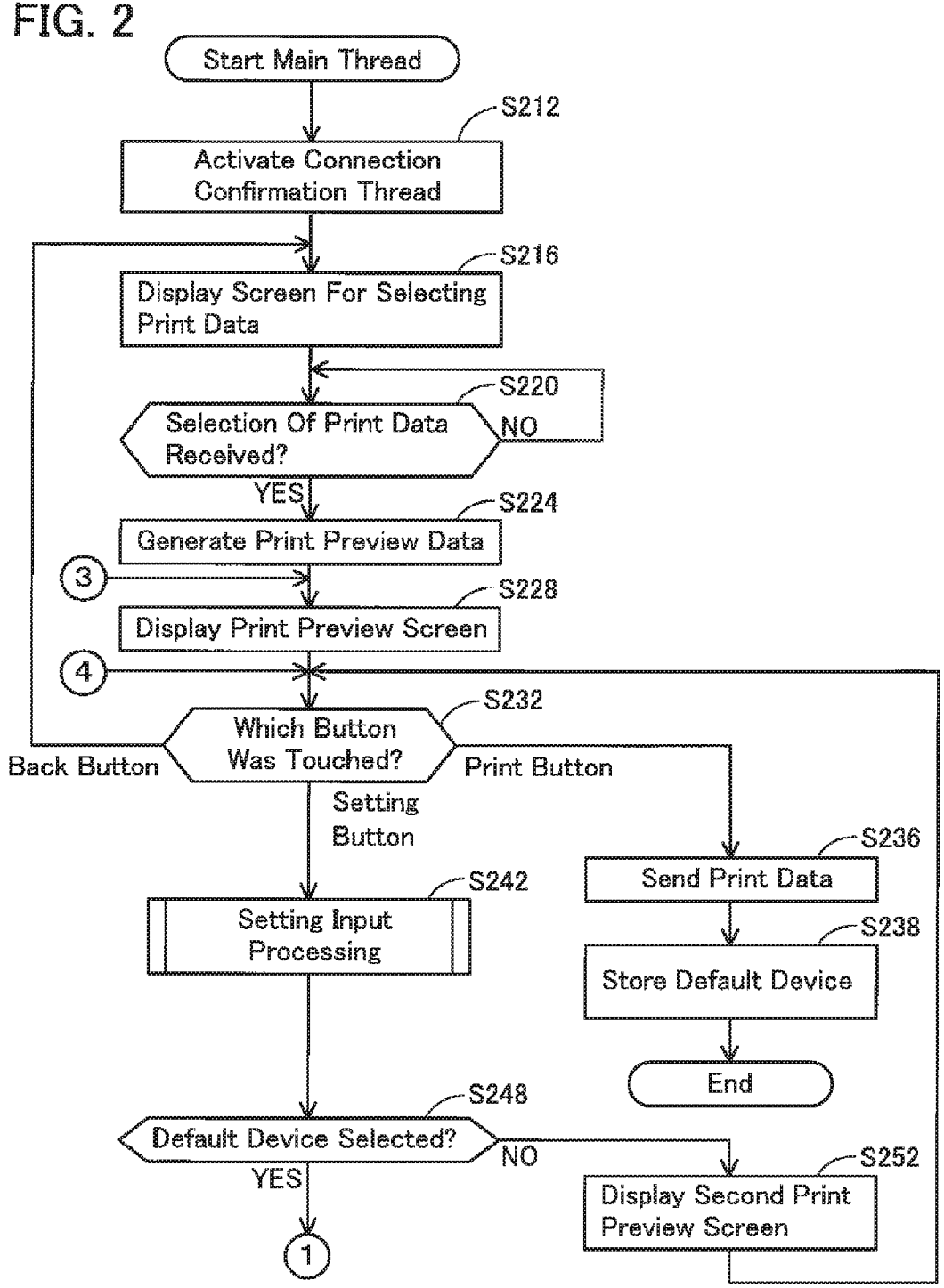
FIG. 2 is a flowchart for explaining an operation example of a main thread.

The processing performed by the CPU 106 to control the respective components according to the print & scan application 121 is now explained. When the print & scan application 121 is activated, a main thread shown in FIG. 2 is started.

In S212, the CPU 106 activates the connection confirmation thread in accordance with the activation of the print & scan application 121. The connection confirmation thread is processing for confirming whether communication with the communication destination printing device is possible.

Figure 5:
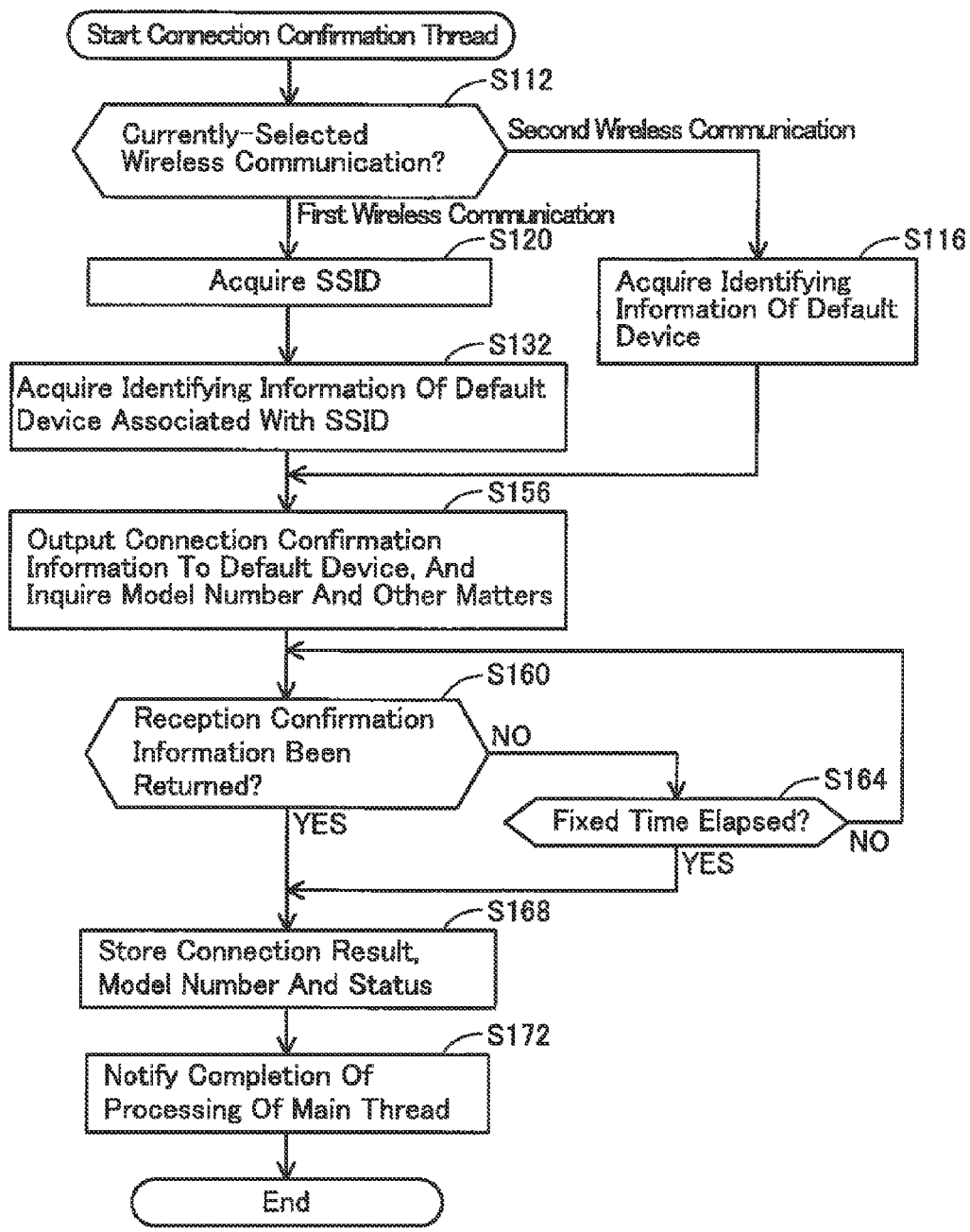
FIG. 5 is a flowchart for explaining an operation example of the connection confirmation thread.

The processing contents of the connection confirmation thread are now explained with reference to the flow of FIG. 5. In S112, the CPU 106 determines which of the first wireless communication 151 or the second wireless communication 152 has been selected for communicating with an external device. The wireless communication may also be selected in advance by the user on the setting screen described later. When it is determined, that the first wireless communication 151 has been selected (S112: first wireless communication), the CPU 106 proceeds to S120.

In S120, the CPU 106 acquires the SSID of the access point, of either the access point 500 or the access point 501, to which the information processing device 100 is currently connected. The information processing device 100 is connected to one access point among a plurality of access points within a communicable range based on the operation of the operating system 124. The print & scan application 121 recognizes the currently-connected access point based on the information that is output by the operating system 124.

In S132, the CPU 106 acquires the identifying information of the default device that is associated with the acquired SSID. Specifically, the CPU 106 refers to the storage area corresponding to the acquired SSID 600 in the table TB1 of FIG. 7. Subsequently, the CPU 106 reads the identifying information 603 of the device in which the default device flag 608 is "ON". The CPU 106 thereafter proceeds to S156.

Meanwhile, in S112, when it is determined that the second wireless communication 152 has been selected (S112: second wireless communication), the CPU 106 proceeds to S116. In S116, the CPU 106 acquires the identifying information of the default device. Specifically, the CPU 106 reads the identifying information 703 of the device in which the default device flag 708 is "ON" in the table TB2 of FIG. 8. The CPU 106 thereafter proceeds to S156.

In S156, the CPU 106 outputs the connection confirmation information to the default device. Specifically, the CPU 106 attempts communication with the default device using the IP address acquired in S132, or the MAC address acquired in S116. The connection confirmation information is information for confirming whether communication is possible. Moreover, the connection confirmation information is information for requesting the default device to return the reception confirmation information. The reception confirmation information is information including: the status indicating the device status of the default device such as the power ON state or occurrence of any error; the model number of the default device; and other matters.

In S160, the CPU 106 determines whether the reception confirmation information was returned from the default device. When a positive determination is obtained (S160: YES), the CPU 106 proceeds to S168, and temporarily stores, in the RAM 108, the fact that connection to the default device is possible, and the model number and status received from the default device.

Meanwhile, when a negative determination is obtained in S160 (S160: NO), the CPU 106 proceeds to S164. In S164, the CPU 106 determines whether a predetermined fixed time has elapsed. When a negative determination is obtained (S164: NO), the CPU 106 returns to S160. Moreover, when a positive determination is obtained (S164: YES), the CPU 106 proceeds to S168, and temporarily stores in the RAM 108 the fact that connection to the default device is not possible.

In S172, the CPU 106 notifies the completion of the connection continuation thread to the main thread. The CPU 106 thereby ends the connection confirmation thread.

In S216 of FIG. 2, the CPU 106 displays, on the display unit 102, a screen for selecting the print data, which is the image data to be printed. Specifically, the CPU 106 displays, on the display unit 102, a list of thumbnails of image data stored in the storage unit 109. Here, when all thumbnails need to be displayed on the display unit 102, the display of all thumbnails may be enabled by scrolling.

In S220, the CPU 106 determines whether the selection of print data has been received. Specifically, the CPU 106 determines whether the portion displaying the thumbnail on the display unit 102 has been touched by the user. When the portion has been touched, the CPU 106 determines that the instruction for processing the image data of the thumbnail displayed at the touched portion to be the print data has been received (S220: YES), and proceeds to S224. Meanwhile, when it is determined that the selection of print data has not been received (S220: NO), the CPU 106 returns to S220 and repeats the determination. Note that the data format of the image data and the print data may be the same or different. For example, both the image data and the print data may be of the Joint Photographic Experts Group (referred to as JPEG) format. Moreover, for example, the image data may be of the Portable Document Format (referred to as PDF) format, and the print data may be of the JPEG format that was converted from the PDF format.

In S224, the CPU 106 generates the print preview data. The print preview data is data for displaying the print preview image on the display unit 102. The print preview image is an image indicating the mode of the printing result that is Obtained when the default device executes printing using the print data.

In S228, the CPU 106 displays the print preview screen on the display unit 102. When a result indicating that connection with the default device is possible is obtained based on the connection confirmation thread executed in S212, the first print preview screen is displayed. The first print preview screen is a screen that is displayed when the default device has been selected, and the print execution instruction can be received. Meanwhile, when a result indicating that connection with the default device is not possible is obtained based on the connection confirmation thread executed in S212, or when the default device has not been selected, the second print preview screen is displayed. The second print preview screen is a screen that is displayed when the print execution instruction cannot be received.

Figure 9:
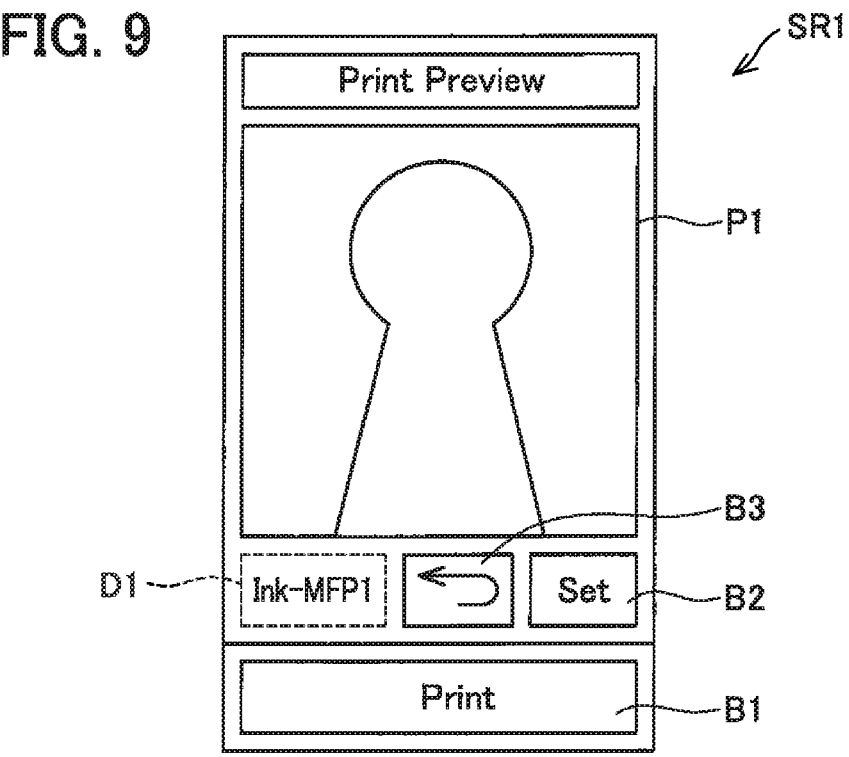
FIG. 9 shows an example of a first print preview screen SR1.

FIG. 9 shows a display example of a first print preview screen SR1. The first print preview screen SR1 includes a preview image P1, a print button B1, a setting button B2, a back button B3, and default device information D1. The preview image P1 is an image indicating the print preview. The print button B1 is a button for accepting the input of the print execution command. The setting button B2 is a button for displaying the setting screen for accepting the input or change of various settings relating to printing. The back button B3 is a button for accepting the processing of returning the display screen to the immediately preceding screen. The back button B3 may also be a physical key equipped in the input I/F 104. The default device information D1 is information (for instance, model number) for identifying the default device. The default device information D1 may also be displayed on the condition that the return of the reception confirmation information from the default device in S160 is confirmed.

Figure 10:
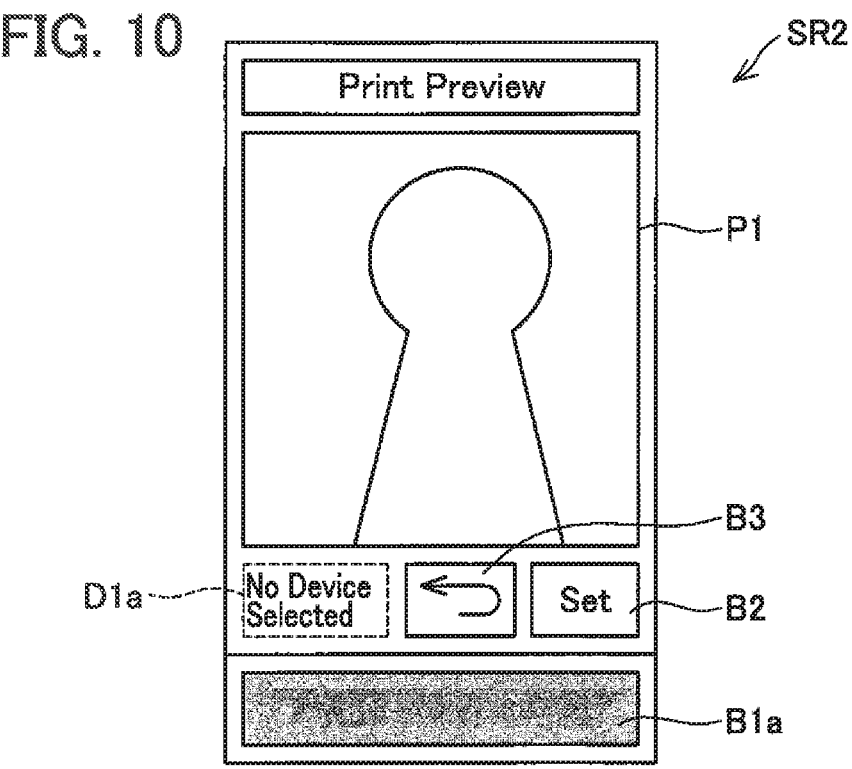
FIG. 10 shows an example of a second print preview screen SR2.

FIG. 10 shows a display example of a second print preview screen SR2. The second print preview screen SR2 includes a print button B1a, and default device information D1a. The print button B1a is a button for displaying that the input of the print execution command cannot be accepted. The print button B1a may also be a button in which, the print button B1 shown in FIG. 9 is grayed out. The default device information D1a is information indicating that the default device has not yet been selected.

In S232, the CPU 106 determines whether any of the buttons have been touched by the user. When the back button B3 was touched (S232: back button), the CPU 106 returns to the S216, and once again displays the screen for selecting the print data.

Meanwhile, when the print button B1 was touched (S232: print button), the CPU 106 determines that the print execution processing was selected, and proceeds to S236. In S236, the CPU 106 sends the print data to the default device via the first wireless communication 151 or the second wireless communication 152. The default device executes the print processing using the received print data.

In S238, the CPU 106 stores, in the storage unit 109, the default device to which the print data was sent. Specifically, when the print data was sent using the first wireless communication 151, the CPU 106 turns "ON" the default device flag 608 of the device to which the print data was sent this time and turns "OFF" the default device flag 608 of the other devices in the table TB1 of FIG. 7. Moreover, when the print data is sent using the second wireless communication 152, the CPU 106 turns "ON" the default device flag 708 of the device to which the print data was sent this time and turns "OFF" the default device flag 708 of the other devices in the table TB2 of FIG. 8. It is thereby possible to store the device that executed the processing last as the default device. The CPU 106 thereby ends the main thread.

Moreover, in S232, when the setting button B2 was touched (S232: setting button), the CPU 106 proceeds to S242. In S242, the CPU 106 executes the setting input processing. Contents of the setting input processing are now explained with reference to FIG. 6 and FIG. 6A.

Figure 11:
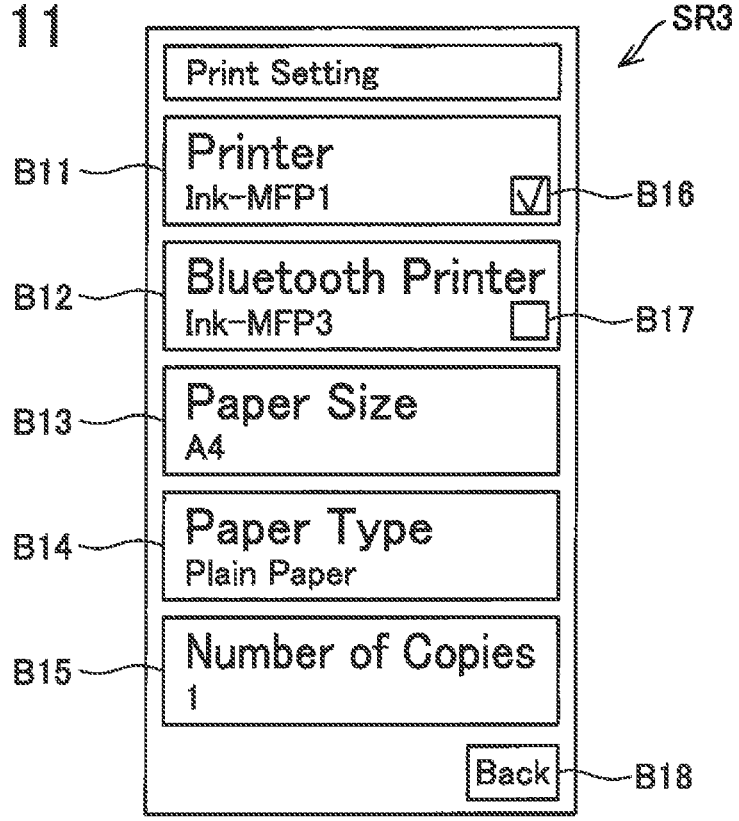
FIG. 11 shows an example of a setting screen SR3.

In S430, the CPU 106 displays the setting screen on the display unit 102. FIG. 11 shows a display example of a setting screen SR3. The setting screen SR3 includes a first default device selection button B11, a second default device selection button B12, a paper size selection button B13, a paper type selection button B14, a copy number button B15, a first communication path selection button B16, a second communication path selection button B17, and a back button B18. The first default device selection button B11 is a button for accepting a request for re-setting the default device in a case that the first wireless communication 151 is selected as the communication path. The expression "re-setting the default device" refers to re-selecting another device as the default device when a default device has previously been set. The first default device selection button B11 may also display the model number of the device that is currently selected as the default device. The second default device selection button B12 is a button for accepting a request for re-setting the default device in a case that the second wireless communication 152 is selected as the communication path. The second default device selection button B12 may also display the model number of the device that is currently selected as the default device.

The first communication path selection button B16 is a button for accepting a request for selecting the first wireless communication 151 as the communication path. The second communication path selection button B17 is a button for accepting a request for selecting the second wireless communication 152 as the communication path. Note that, when the first default device selection button B11 or the first communication path selection button B16 is touched in a state where neither the first wireless communication 151 nor the second wireless communication 152 is selected as the communication path, the CPU 106 operates on the assumption that a request for selecting the first wireless communication 151 as the communication path and a request for newly selecting the default device have been received. Moreover, when the second default device selection button B12 or the second communication path selection button B17 is touched in a state where neither the first wireless communication 151 nor the second wireless communication 152 is selected as the communication path, the CPU 106 operates on the assumption that a request for selecting the second wireless communication 152 as the communication path and a request for newly selecting the default device have been received. The paper size selection button B13 is a button for accepting the setting of the paper size to be used in the printing to be executed by the default device. As examples of the paper size, there are, for example, A4 size, B5 size and the like. The paper type selection button B14 is a button for accepting the setting of the paper type to be used in the printing to be executed by the default device. As examples of the paper type, there are, for example, plain paper, gloss paper and the like. The copy number button B15 is a button for accepting the setting of the number of copies to be printed in the printing to be executed by the default device. The currently selected print setting may also be displayed on the buttons B13 to B15. The back button B18 is a button for accepting the processing of returning the display screen to the immediately preceding screen.

In S434, the CPU 106 determines whether a request for setting the default device was accepted. Specifically, the CPU 106 determines whether any one of the Hewing were performed: namely, the first default device selection button B11 was touched by the user in a case that the first wireless communication 151 is selected as the communication path; the second default device selection button B12 was touched by the user in a case that the second wireless communication 152 is selected as the communication path; and any one of the buttons B11, B12, B16, B17 were touched in a state where neither the first wireless communication 151 nor the second wireless communication 152 is selected as the communication path. When a negative determination is obtained (S434: NO), the CPU 106 proceeds to S460, and when a positive determination is obtained (S434: YES), the CPU 106 proceeds to S436.

In S436, the CPU 106 displays the device list on the display unit 102. The device list displays a list of devices that correspond to the currently-selected wireless communication. For example, in a case that the first wireless communication 151 is selected and the device is in a state of being connected to the access point 500, the model number 601 (that is, "Ink-MFP 1"

and "Ink-MFP 2") and the IP address 602 (that is, "211.9.36.148" and "211.9.36.154") stored in the storage area R1 corresponding to "SSID-1" in the table TB1 of FIG. 7 are displayed on the display unit 102. Moreover, the CPU 106 causes the display unit 102 to display an input column for inputting the IP address of a new device for executing printing.

In S440, the CPU 106 determines whether the touch panel 103 has accepted an IP address input operation, which is an operation of inputting the IP address of the newly registered device, or a device designation operation, which is an operation of selecting the displayed model number and other matters. When the device designation operation is executed (S440: device designation), the CPU 106 proceeds to S448, and when the IP address input operation is executed (S440: IP address input), the CPU 106 proceeds to S444.

In S444, the CPU 106 stores, in the table Tat, the IP address input in the IP address input operation. Moreover, the CPU 106: receives the model number 601 via the first wireless communication 151; and stores the received model number 601 in the table TB1 in association with the input IP address. The method of receiving and storing the model number 601 is now explained. The CPU 106 controls the first wireless communication DT 131, and causes the network 10, to which the information processing device 100 is connected, to perform a unicast of sending a packet. The packet is for requesting the device to return the model number 601 of that device. The input IP address is set as the packet's destination. Consequently, the model number 601 is returned from the device connected to the network 10 and which has the IP address that was set as the destination. The first wireless communication I/F 131 receives the packet including the model number 601 of the device that is returned from the device. Subsequently, the CPU 106 stores the received device model number 601 and the input IP address 602 which are associated with each other in the table TB1.

In S448, the CPU 106 sets the device corresponding to the IP input in S440 (S440: IP address input) or the device input by the user (S440: device designation) as the default device. Specifically, the CPU 106 turns "ON" only the default device flag of the device that was newly set as the default device, and turns "OFF" of the default device flags of the other devices in the tables TB1 and TB2. Moreover in S448, the CPU 106 turns "ON" the default device setting execution flag stored in the storage unit 109. The default device setting execution flag is information indicating that the setting of the default device was executed by the user.

In S452, the CPU 106 activates the connection confirmation thread. Since the contents of the connection confirmation thread have previously been explained with reference to FIG. 5, the explanation thereof is omitted. The CPU 106 thereafter proceeds to S454.

In S454, the CPU 106 determines whether the connection confirmation thread that was started in S452 is complete. When a negative determination is obtained (S454: NO), the CPU 106 proceeds to S455, and determines whether a predetermined fixed time has elapsed. In S455, when a negative determination is obtained (S455: NO), the CPU 106 returns to S454, and when a positive determination is obtained (S455: YES), the CPU 106 proceeds to S458. Meanwhile, when a positive determination is obtained in S454 (S454: YES), the CPU 106 proceeds to S456, and determines the confirmation result of the connection confirmation thread. In S456, when a result indicating that connection to the default device is possible is obtained (S456: OK), the CPU 106 proceeds to S460, and when a result indicating that connection to the default device is not possible is obtained (S456: NG), the CPU 106 proceeds to S458. In S458, the CPU 106 displays, on the display unit 102, error information for notifying the user that connection to the default device is not possible. Moreover, the CPU 106 causes the display unit 102 to display a button image for accepting the instruction for re-setting the default device, and a button image for accepting the instruction for maintaining the status quo.

In S460, the CPU 106 determines whether the print setting has been changed. As an example of the print setting being changed, considered may be the paper size being changed from an A4 size to a B5 size. The paper size may be changed by the user touching the paper size selection button B13 on the setting screen SR3 of FIG. 11. When a negative determination is obtained in S460 (S460: NO), the CPU 106 proceeds to S472, and when a positive determination is obtained (S460: YES), the CPU 106 proceeds to S468. In S468, the CPU 106 stores, in the storage unit 109, the setting value of the changed print setting. Note that, in S468, the CPU 106 stores, in the storage unit 109, print setting differentiation information for differentiating the print setting that was changed and the print setting that was not changed. The CPU 106 thereafter proceeds to S472.

In S472, the CPU 106 determines whether the communication path setting has been changed. Specifically, the CPU 106 determines whether any one of the following was performed; namely, the second communication path selection button B17 was touched in a case that the first wireless communication 151 is selected as the communication path, and the first communication path selection button B16 was touched in a case that the second wireless communication 152 is selected as the communication path. When a negative determination is obtained in S472 (S472: NO), the CPU 106 proceeds to S480, and when a positive determination is obtained (S472: YES), the CPU 106 proceeds to S476. In S476, the CPU 106 stores, in the storage unit 109, the setting value for identifying the selected communication path. Note that, in S476, the CPU 16 stores, in the storage unit 109, communication path change information indicating that that communication path has been changed.

In S480, the CPU 106 updates the setting screen. Specifically, the CPU 106 updates the setting screen so as to display the default device, the print setting, the communication path and the like stored in the storage unit 109. In S484, the CPU 106 determines whether the back button B18, which is a button for accepting the completion of the setting input, was touched. When a negative determination is obtained in S484 (S484: NO), the CPU 106 returns to S434. The user can thereby once again perform operations relating to the setting input. Meanwhile, when a positive determination is obtained in S484 (S484: YES), the CPU 106 ends the setting input processing.

In S248 of FIG. 2, the CPU 106 determines whether the default device has been selected. When a negative determination is obtained in S248 (S248: NO), the CPU 106 proceeds to S252. In S252, the CPU 106 displays the second print preview screen on the display unit 102. The CPU 106 thereafter returns to S232.

Meanwhile, when a positive determination is obtained in S248 (S248: YES), the CPU 106 proceeds to S254. In S254, the CPU 106 determines whether the default device was set or changed by the user in the setting input processing of S242. Specifically, the CPU 106 determines whether the default device setting execution flag stored in the storage unit 109 is "ON". When a positive determination is obtained in S254 (S254: YES), the CPU 106 sets the setting execution flag to "OFF", and then returns to S228. Consequently, when in a state that is immediately after the default device was set by the user, the connection confirmation thread of S272 can be skipped. This is because, when the default device is set by the user, the connection confirmation has already been performed in the processing of S452 and subsequent steps. Thus, it is possible to prevent any unneeded connection confirmation thread from being executed. Meanwhile, when a negative determination is obtained in S254 (S254: NO), the CPU 106 proceeds to S256. In S256, the CPU 106 determines, based on the communication path change information, whether the communication path to be used has been changed between the first wireless communication 151 and the second wireless communication 152 in the setting input processing of S242. When a positive determination is obtained in S256 (S256: YES), the CPU 106 invalidates the communication path change information and then proceeds to S272, and, when negative determination is obtained in S256 (S256: NO), the CPU 106 proceeds to S260.

In S260, the CPU 106 determines whether the print setting has been changed in the setting input processing of S242. Specifically, the CPU 106 refers to the print setting differentiation information, and determines Whether there is any print setting that has been changed. When a negative determination is obtained in S260 (S260: NO), the CPU 106 returns to S228, and when a positive determination is obtained (S260: YES), the CPU 106 proceeds to S268.

In S268, the CPU 106 determines whether the setting that was changed in the setting input processing of S242 was a confirmation-required setting. The confirmation-required setting is a setting in which, when a change is made, an inquiry needs to be made to the default device on whether that device is compatible with the new setting. As an example of a confirmation-required setting, considered may be a special paper size (for example, A3 size) that requires an additional tray. An additional tray is a tray that is not included in the initial configuration of the device, and is a tray that needs to be separately purchased and added by the user. When the setting is changed to use the special paper size, it becomes necessary to confirm whether the additional tray is mounted on the default device. Moreover, as an example of a confirmation-required setting, considered may be a special printing medium (for example, CD label) that requires a dedicated tray. When the setting is changed to use a special printing medium, it becomes necessary to confirm whether the dedicated tray is mounted on the default device. Moreover, as an example of a confirmation-required setting, considered may be a setting of increasing the number of copies. When the number of copies is to be increased, it becomes necessary to confirm whether the number of sheets set in the tray is sufficient for printing the increased number of copies. When a negative determination is obtained in S268 (S268: NO), the CPU 106 invalidates the print setting differentiation information and then returns to S228, and when a positive determination is obtained (S268: YES), the CPU 106 invalidates the print setting differentiation information and then proceeds to S272.

In S272, the CPU 106 activates the connection confirmation thread. Since the contents of the connection confirmation thread have previously been explained with reference to FIG. 5, the explanation thereof is omitted.

In S276, the CPU 106 determines whether it is necessary to re-generate the print preview data. Specifically, the CPU 106 determines Whether a print setting, that will affect the printing results, has been changed in the setting input processing of S242. As an example of the print setting that will affect how the printing is performed, considered may be the paper size or the paper type. When a negative determination is obtained in S276 (S276: NO), the CPU 106 proceeds to S284, and when a positive determination is obtained (S276: YES), the CPU 106 proceeds to S280.

In S280, the CPU 106 re-generates the print preview data based on the newly changed print setting. The CPU 106 thereafter proceeds to S284.

In S284 the CPU 106 determines whether the connection confirmation thread that was started in S272 is complete. When a negative determination is obtained in S284 (S284: NO), the CPU 106 proceeds to S288, and determines whether a predetermined fixed time has elapsed. When a negative determination is obtained in S288 (S288: NO), the CPU 106 returns to S284, and when a positive determination is obtained (S288: YES), the CPU 106 proceeds to S300. Meanwhile, when a positive determination is obtained in S284 (S284: YES), the CPU 106 proceeds to S292, and determines the confirmation result of the connection confirmation thread. When a result indicating that connection to the default device is possible is obtained in S292 (S292: OK), the CPU 106 proceeds to S296, and displays the first print preview screen on the display unit 102 in S296. Since the display contents of the first print preview screen have previously been explained with reference to S228 and FIG. 9, the explanation thereof is omitted. The CPU 106 thereafter returns to S232.

Meanwhile, in S292, when a result indicating that connection to the default device is not possible is obtained (S292: NG), the CPU 106 proceeds to S300. In S300, the CPU 106 displays, on the display unit 102, error information for notifying the user that connection to the default device is not possible. Moreover, the CPU 106 causes the display unit 102 to display a button image for accepting the instruction for re-setting the default device, and a button image for accepting the instruction for maintaining the status quo.

In S304, the CPU 106 determines the instruction that was input by the user. When the instruction is an instruction for re-setting the default device (S304: re-setting), the CPU 106 returns to S430, and causes the display unit 102 to display the setting screen SR3 of FIG. 11. The setting screen SR3 may also display information indicating that connection to the default device is not possible. For example, in cases that the first wireless communication 151 is selected as the communication path, information indicating that the default device has not yet been selected (for example, "No Device Selected") may be displayed on the first default device selection button B11. Moreover, here, the table TB1 may also be in a state where the default device flag 608 of any one of the devices is "ON", and, internally, the default device has been selected.

Meanwhile, in S304, when the instruction is an instruction for maintaining the status quo (S304: maintain status quo), the CPU 106 proceeds to S312. In S312, the CPU 106 determines whether generation of the print preview data is complete. When a negative determination is obtained in S312 (S312: NO), the CPU 106 proceeds to S316, activates the connection confirmation thread, and then returns to S284. Meanwhile, when a positive determination is obtained in S312 (S312: YES), the CPU 106 returns to S228, and displays the second print preview screen on the display unit 102.

<Effect>

In the connection confirmation thread (S272), there may be cases that the completion of the processing takes time since various types of information need to be communicated with the default device. Moreover, in the print preview screen display processing (S296), there may be cases that the completion of the processing takes time since the preview image data is prepared. According to the print & scan application 121 and the like described in this specification, the connection confirmation thread (S272) can be activated on the condition that the starting condition of the print preview screen display processing (S296) is satisfied. Moreover, the end of the setting input processing (S242) can be used as the starting condition of the print preview screen display processing (S296). The determination of whether the setting input processing (S242) has ended may be made based on whether the button for accepting the setting input (for example, back button B18) was touched in S484. Since it is thereby possible to use the processing time required for the print preview screen display processing as the processing time of the connection confirmation thread, the total processing time can be shortened. Thus, it is possible to suppress the occurrence of a situation where, at the time that the user confirms the print preview screen and subsequently attempts to input the print execution instruction, the print execution instruction cannot be input because the connection confirmation processing is being executed.

Moreover, it is possible to adopt a scheme where the connection confirmation thread is not executed when the print preview screen display processing (S228) is executed for the first time, and execute the connection confirmation thread (S272) when the print preview screen display processing (S296) is executed for the second and subsequent times. Since the print preview screens that are displayed for the second and subsequent times are screens that are displayed after the setting input processing of the print setting, they have the disposition of being the final confirmation of how the printing is to be performed prior to executing the print processing. In other words, when the print preview screen is displayed for the second and subsequent times (S296), it can be deemed that the possibility of the user executing the print processing is higher in comparison to the case when the print preview screen is displayed for the first time (S228). Thus, by selectively executing the connection confirmation thread when the print preview screen is displayed for the second and subsequent times, it is possible to prevent any unneeded connection confirmation thread from being executed. Since it is thereby possible to prevent the execution of unneeded communication processing, power consumption of the information processing device 100 can be reduced.

According to the print & scan application 121 and the like described in this specification, the change of the print setting (S260: YES) in the setting input processing (S242) can be used as the condition for executing the connection confirmation thread (S272). When the print setting is changed, it can be deemed that the possibility of the user executing the print processing is higher in comparison to the case when the print setting is not changed, Thus, by selectively executing the connection confirmation thread when the print setting is changed, it is possible to prevent any unneeded connection confirmation thread from being executed. Consequently, for example, in a case that the setting screen was displayed on the display unit 102 (S430) and the setting input processing (S242) was executed, but none of the settings were changed (S260: NO), it is possible to control so that the connection confirmation thread (S272) is not executed.

According to the print & scan application 121 and the like described in this specification, the change in the setting of the communication path in the setting input processing (S242) (S256: YES) can be used as the condition for executing the connection confirmation thread (S272). When the setting of the communication path is changed, it can be deemed that the possibility of the user executing the print processing is higher in comparison to the case when the setting of the communication path is not changed. Thus, by selectively executing the connection confirmation thread when the setting of the communication path is changed, it is possible to prevent any unneeded connection confirmation thread from being executed.

According to the print & scan application 121 and the like described in this specification, the change in the confirmation-required setting (S268: YES) can be used as the condition for executing the connection confirmation thread (S272). A confirmation-required setting is a setting in which, when a change is made, an inquiry needs to be made to the default device on whether that device is compatible with the newly changed setting. Thus, by executing the connection confirmation thread, it is possible to make an inquiry to the default device on whether it is compatible with the newly changed confirmation-required setting.

According to the print & scan application 121 and the like described in this specification, the connection confirmation processing can be executed not at the stage that the user input relating to the print setting is received (S468), but at the stage that the change in the print setting is confirmed (S484: YES). Since it is thereby possible to prevent any unneeded connection confirmation processing from being performed, the user-friendliness can be improved.

According to the print & scan application 121 and the like described in this specification, the connection confirmation thread (S212) can be activated when the print & scan application 121 is activated (at the start of the flow of FIG. 2). Consequently, the connection confirmation thread (S272) only needs to be re-executed when the print preview screen display processing (S296) is executed for the second and subsequent times. Thus, it is possible to prevent any unneeded connection confirmation thread from being executed.

According to the print & scan application 121 and the like described in this specification, the connection confirmation thread (S452) can be executed on the condition that the default device is re-set by the user (S448). It is thereby possible to perform the connection confirmation processing to the re-set default device.

According to the print & scan application 121 and the like described in this specification, processing of displaying the print preview screen and other processing are executed in the main thread, and the connection confirmation processing performed to the default device is executed in the connection confirmation thread. Since both threads can consequently be processed in parallel, the connection confirmation processing can be executed while the print preview display processing is being performed. Thus, since the total processing time can be shortened, it is possible to improve the user-friendliness.

According to the print & scan application 121 and the like described in this specification, information (for example, model number) for indicating the default device can be displayed together with the preview image when displaying the first print preview screen on the display unit 102 (S228, S296). For example, the default device information D1 for identifying the default device can be displayed together with the preview image P1 (refer to FIG. 9). It is thereby possible to enhance the user to recognize how the printing is to be performed and recognize which device is going to execute the printing.

According to the print & scan application 121 and the like described in this specification, the first print preview screen can be displayed on the display unit 102 in a mode capable of accepting the input of the print execution command (S228, S296). For example, the print button B1 for accepting the input of the print execution command can be displayed together with the preview image P1 (refer to FIG. 9). It is thereby possible to accept the print execution instruction in the default device after having enhanced the user to recognize how the printing is to be performed.

The specific embodiments have been described above, however, these are merely examples and do not limit the scope of the claims. The technology disclosed in the claims include modifications and alterations of the aforementioned embodiments. Below, some of the modifications will be described.

<Modified Example>

It is possible to omit at least one among the processing (S260) of determining whether the print setting has been changed, the processing (S254) of determining whether the default device has been subject to operations such as setting by the user, and the processing (S268) of determining whether the setting that was changed in the setting input processing is a confirmation-required setting. The processing (S212) of activating the connection confirmation thread according to the activation of the print & scan application 121 may be omitted. The processing (S452) of activating the connection confirmation thread according to the default device being set by the user may be omitted. Here, the CPU 106 may proceed from S444 to S460. According to the above, in general, the information processing device 100 simply needs to include at least a "storing identifying information", "executing print preview display processing", "sending the print information", "executing first connection confirmation processing", and "displaying a reception confirmation image". Specifically, the information processing device 100 simply needs to perform at least the processes of S236, S238, S272, S280, and S296.

The method of determining whether to activate the connection confirmation thread (S272) in S260 may be based on various other methods. For example, whether to activate the connection confirmation thread (S272) may also be determined based on whether the user input relating to the print setting was accepted by the information processing device 100. As an example of the user input relating to the print setting, considered may be the touch input to any one of the buttons of the first default device selection button B11 to copy number button B15 displayed on the setting screen SR3 of FIG. 11. Moreover, for example, whether to activate the connection confirmation thread (S272) may also be determined based on whether the user input instructing a change in the print setting associated with a change in how the printing is performed was accepted by the information processing device. As an example of the input instructing a change in the print setting associated with a change in how the printing is performed, considered may be, an input instructing the change in the setting value that was input on a setting editing screen. The setting editing screen is displayed when where is a touch input to any one of the buttons of the first default device selection button B11 to copy number button B15 displayed on the setting screen SR3 of FIG. 11.

FIG. 11 shows an example of settings made on the setting screen SR3. Color setting and other settings may also be included.

The method of acquiring the SSID of the access point in S120 may be of various modes. For example, adopted may be a configuration where the user manually inputs the SSID of the access point for enabling the information processing device 100 to communicate. Here, the CPU 106 recognizes the access point of the SSID manually input by the user as the communicable access point.

Figure 6:
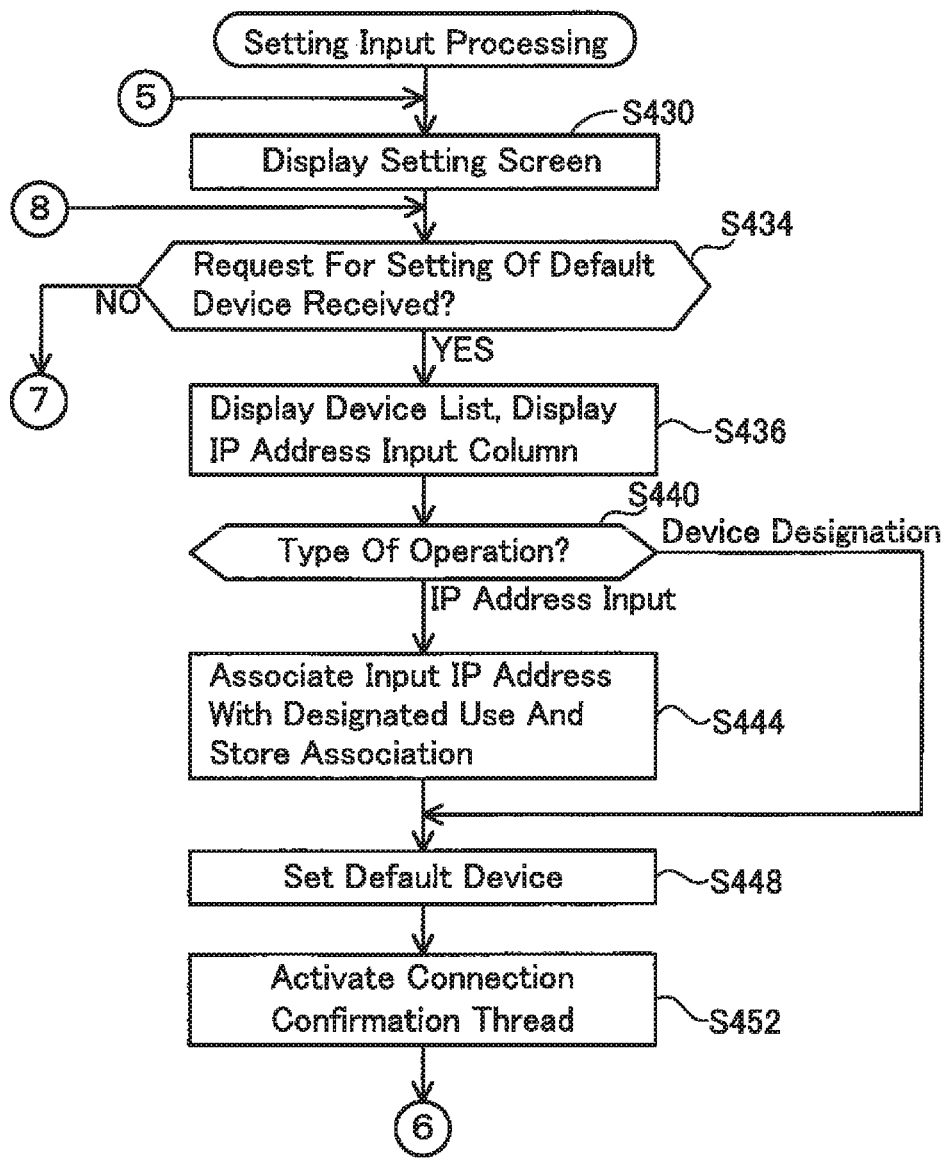
FIG. 6 is a flowchart for explaining an operation example of a setting input processing.
Figure 6A:
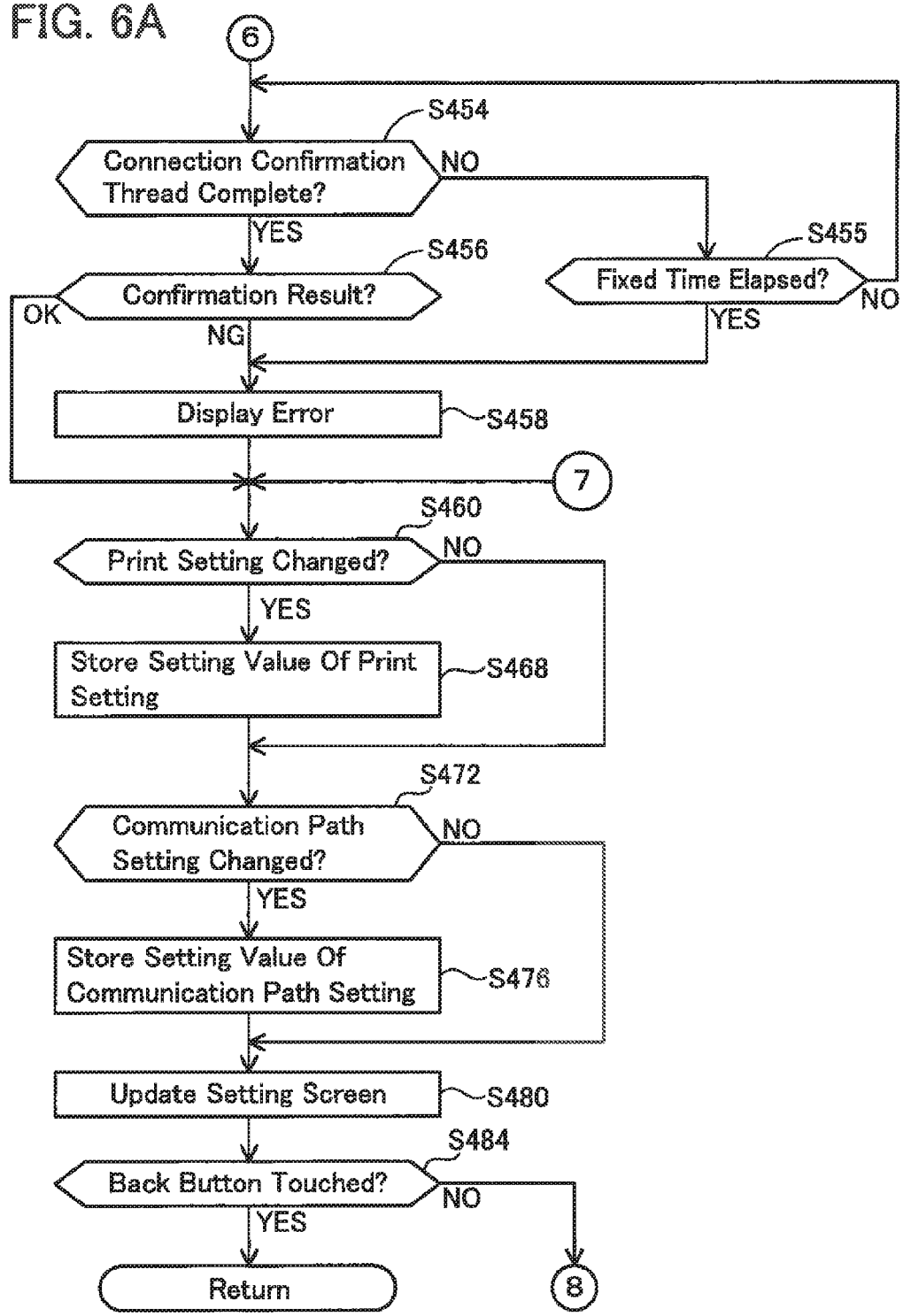
FIG. 6A is a flowchart for explaining an operation example of the setting input processing.

In S436 of FIG. 6, the CPU 106 may also display a device search button on the display unit 102. When the search button is touched, the CPU 106 may broadcast, via the access point 500, a packet requesting the device connected to the access point 500 to return the device model number, and receive the returned model number. Subsequently, the CPU 106 may display, on the display unit 102, the model number received from a plurality of devices via the access point 500 and the IP address of the device as the source of the model number as a device list. Here, the model number 601 and the IP address 602 stored in the storage area R1 corresponding to "SSID-1" in the table TB1 may be displayed preferentially to the received model number and IP address. Moreover, there are cases that the device that returned the model number is selected as the default device in S440. Here, since this is a case that a device, in which the execution of communication was been previously confirmed as being possible, is selected as the default device, the connection confirmation processing of S452 and subsequent steps may be omitted.

The determination of whether the setting input processing (S242) has ended is not limited to the determination of whether a button (for example, back button 918) for accepting the completion of the setting input was touched in S484. For example, the setting input processing may also be ended when the request for setting the default device was not accepted (S434: NO), or when the connection confirmation thread is activated (S452). Moreover, for example, the setting input processing may also be ended when the print setting was not changed (S460: NO), or when the setting value of the print setting is stored (S468). Moreover, for example, the setting input processing may also be ended when the communication path setting was not changed (S472: NO), or when the setting vale for identifying the selected communication path is stored (S476).

Figure 3:
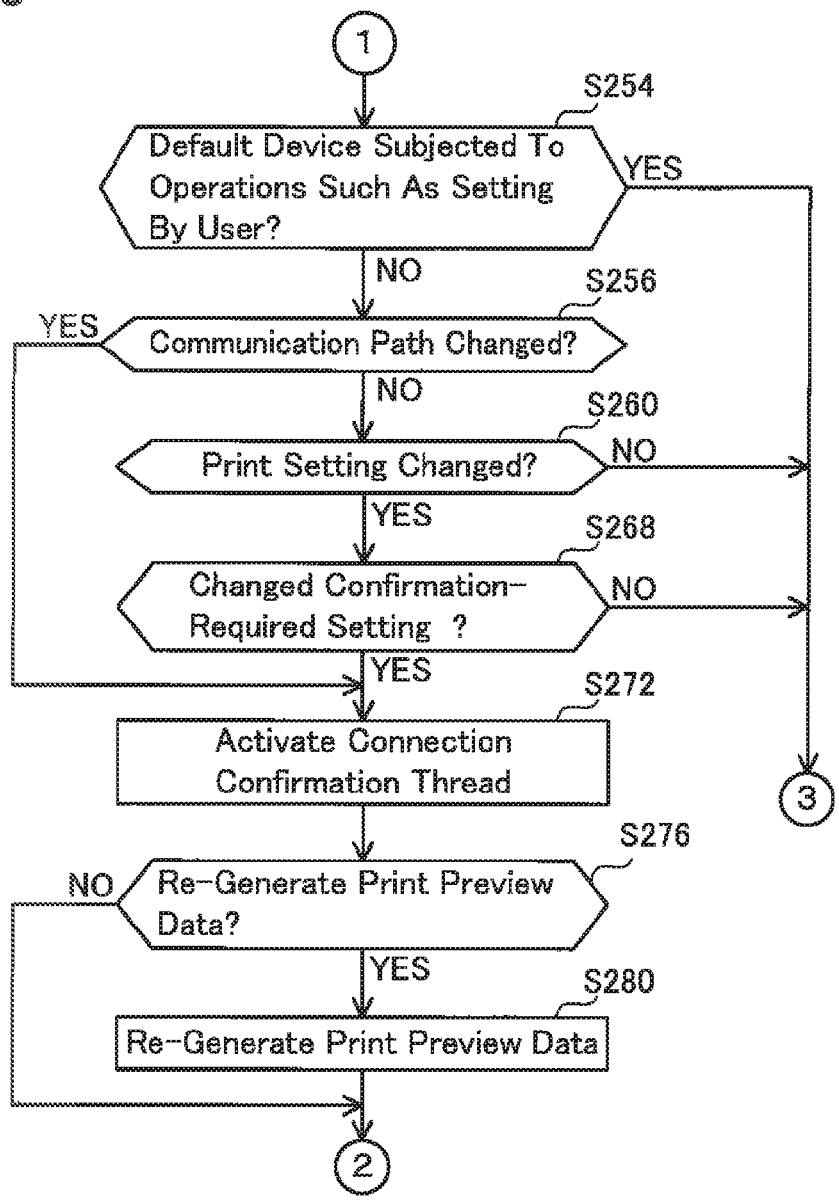
FIG. 3 is a flowchart for explaining an operation example of the main thread.
Figure 4:
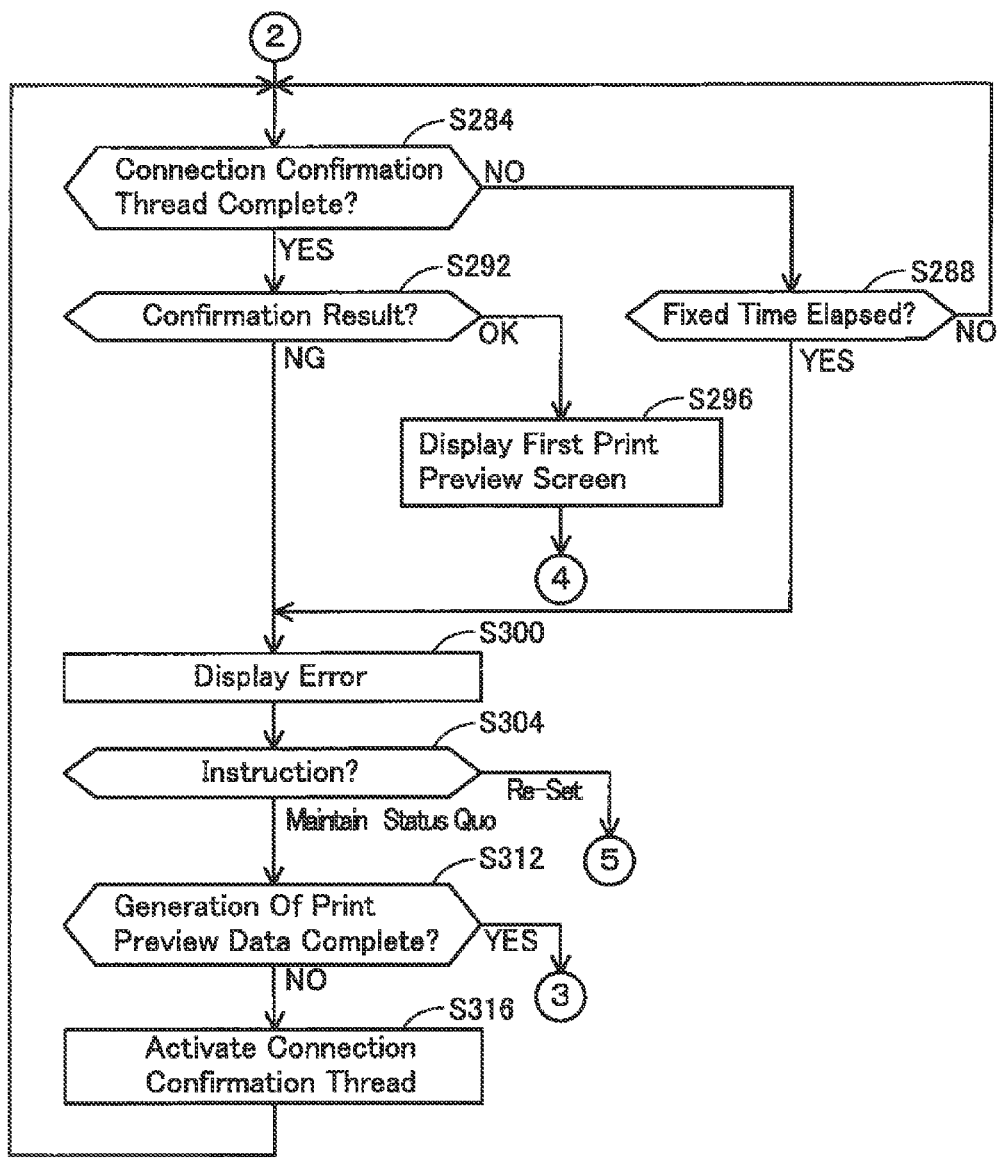
FIG. 4 is a flowchart for explaining an operation example of the main thread.
Figure 12:
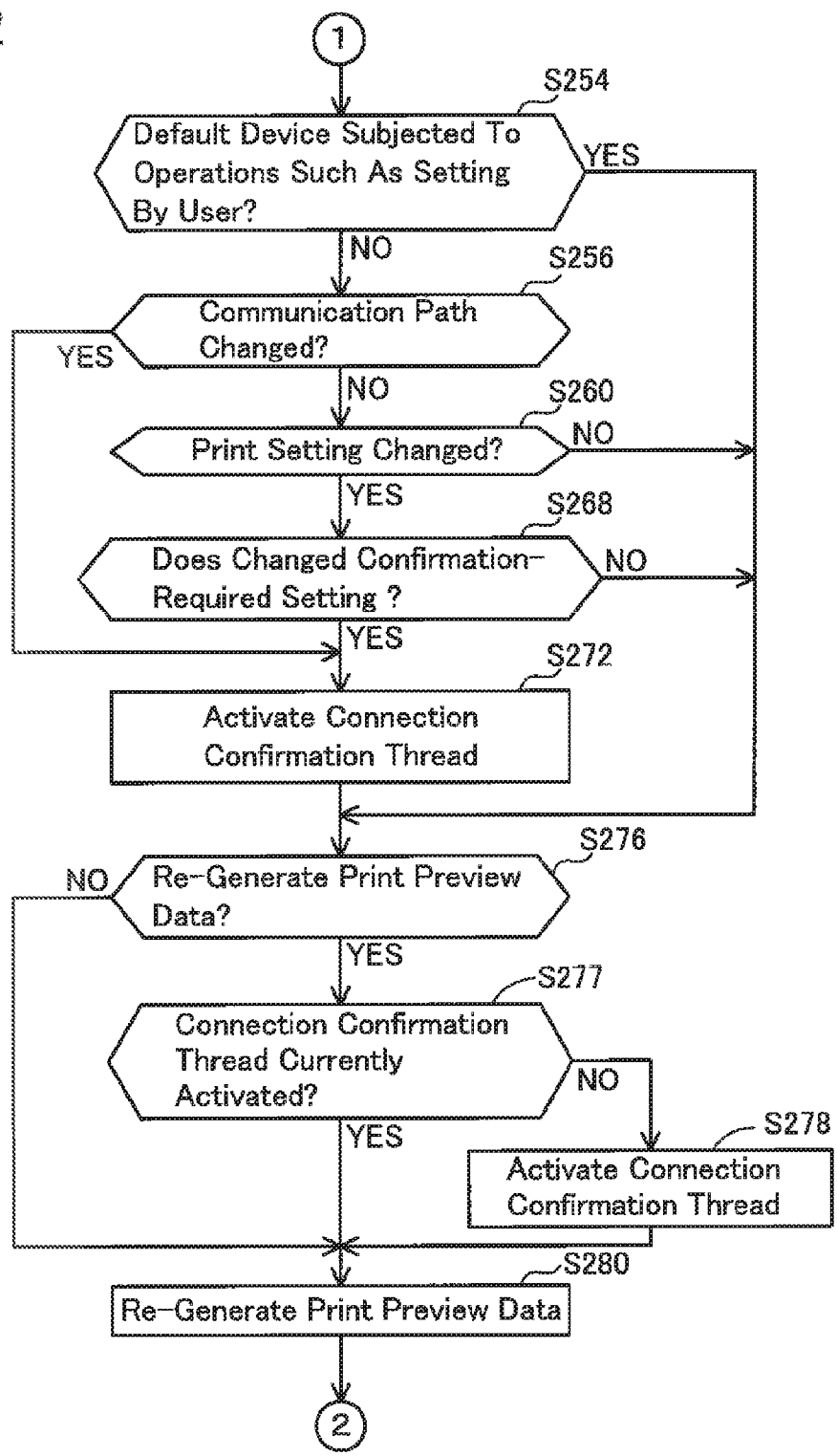
FIG. 12 is a modification of a flowchart explaining the operation example of the main thread.

Moreover, a modified example of the flow of FIG. 3 is shown in FIG. 12. Since the steps in FIG. 12 that are given the same reference numeral as the step in FIG. 3 have already been explained with reference to FIG. 3, the explanation thereof is omitted. When a positive determination is obtained in S254, when a negative determination is obtained in S260, and when a negative determination is obtained in S268, the CPU 106 proceeds to S276. When a positive determination is obtained in S276 (S276: YES), the CPU 106 proceeds to S277. In S277, the CPU 106 determines whether the connection confirmation thread is currently activated. When a positive determination is obtained in S277 (S277: YES), the CPU 106 proceeds to S280, and when a negative determination is obtained (S277: NO), the CPU 106 proceeds to S278. In S278, the CPU 106 activates the connection confirmation thread. The CPU 106 thereafter proceeds to S280. It is thereby possible to execute the connection confirmation thread (S278) when there is an input for changing the print setting which requires the re-generation of the print preview data (S276: YES). Thus, since the total processing time can be shortened as a result of using the print preview data generation time (S280) also as the connection confirmation thread processing time (S278), it is possible to improve the user-friendliness.

Information regarding whether a device has been previously set as the default device may also be added to the information relating to the respective devices stored in the tables TB1 and TB2. Moreover, in S436, a list of devices that have been previously set as the default device may be displayed on the display unit 102. It is thereby possible to select the communication-target device among devices that were used in the past.

The devices connected to the information processing device 100 are not limited to the inkjet MFPs 201 to 203, and the color laser printer 204 illustrated in FIG. 1. Any type of device may be connected so as long as the device comprises a printing function and a scanning function.

Communication between the access points 500 and 501 and the device may be wireless or wired.

The model number 601 and 701 may be of any configuration so as long as the devices can be differentiated and, for example, may be configured only of symbols without containing numbers. Moreover, a name such as the device name capable of differentiating the devices may also be used in substitute for the model number.

The information processing device may also be configured to be connectable to an external memory such as an SD card. In addition, adopted may be a configuration of storing various types of data in an external memory in substitute for the storage unit 109.

While the information processing device 100 was explained as an example of the image processing apparatus, the configuration is not limited thereto. The configuration may also adopt a sewing machine that performs stitching or quilting of a predetermined image based on instruction data. The configuration may also adopt a sewing machine that performs decorative stitching or sewing to form work pieces or products based on image data. The configuration may also adopt a 3D printer that generates 3D images via spraying or machining based on instruction data or the like. The configuration may also adopt work piece manufacturing equipment or product manufacturing equipment that forms work pieces or products via spraying or machining based on image data or the like. As an example of image data, 3D image data or 3D CAD data may be used. The configuration may also adopt a scanner that forms image data based on output data from a sensor which optically or electrically detects the profile of an object or based on output data from a sensor that is mounted on the object. The configuration may also adopt a scanner creates data indicating the shape or movement of an object based on the output from a sensor. As an example of image data, moving image data or 3D image data may be used.

Each program may be constituted by a single program module or by a plurality of program modules. Each example may adopt another replaceable configuration which is within the context of the present invention. Adoptable configurations include a computer (the CPU 106 or the like) which executes processing based on a program (the print & scan application 121 or the like), a computer which executes processing based on a program other than an image processing program such as an operating system and other applications, a hardware configuration (the panel 103 or the like) which operates according to an instruction by a computer, and a configuration in which a computer and a hardware configuration work in conjunction with each other. Obviously, adoptable configurations also include a computer which executes processing by coupling processing based on a plurality of programs, and a hardware configuration which operates according to an instruction by a computer which executes processing by coupling processing based on a plurality of programs.

What is claimed is:

1. A non-transitory computer-readable storage medium storing instructions for an information processing device configured to send print information to a printing device connected with a network,
    the information processing device comprising:
        a communication interface configured to communicate with the network;
        a processor coupled to the communication interface; and
        a storage unit,
    the instructions, when executed by the processor, causing the information processing device to perform:
        storing, in the storage unit, identifying information for identifying a printing device connected with the network;
        executing a first print preview display process comprising displaying, on a display unit, a first print preview image showing a print preview using the print information according to determining the print information among a plurality of image information;
        executing, after the first print preview display process, a second print preview display process comprising displaying, on the display unit, a second print preview image according to a condition for starting the second print preview display process;
        sending, after the first print preview display process or the second print preview display process is executed, the print information to the printing device via the communication interface according to a user input instructing to send the print information;
        executing a first connection confirmation process comprising confirming that a connection to the printing device is established, the printing device being identified by the identifying information, the first connection confirmation process being executed in a case that:
            the condition for starting the second print preview display process is satisfied; and
            a print setting using the print information is changed; and
        displaying, on the display unit, a reception confirmation image in a case that it is confirmed that the connection to the printing device is established,
    wherein the second print preview display process comprises:
        regenerating the second print preview image according to the print setting having been changed; and
        displaying the regenerated second print preview image on the display unit,
    wherein the regenerating the second print preview image, the executing the first connection confirmation process, and the displaying the regenerated second print preview image are performed when it is necessary to regenerate the second print preview image according to the print setting having been changed,
    the executing the second print preview display process is performed when it is not necessary to regenerate the second print preview image, and
    the regenerating the second print preview image and the executing the first connection confirmation process are performed in parallel.

2. The non-transitory computer-readable storage medium according to claim 1, wherein the print setting using the print information requires an inquiry with the printing device about a device status, and the first connection confirmation process is executed in a case that the print setting using the print information had been changed at a time when the condition for starting the second print preview display process is satisfied.

3. The non-transitory computer-readable storage medium according to claim 1, wherein
    the first connection confirmation process is executed in a case that the information processing device receives a user input relating to the print setting using the print information after the first print preview display process or the second print preview display process is executed.

4. The non-transitory computer-readable storage medium according to claim 3, wherein the first connection confirmation process is executed in a case that the information processing device receives a user input instructing a change to the print setting using the print information, the change to the print setting associated with a print mode change, after the first print preview display process or the second print preview display process is executed.

5. The non-transitory computer-readable storage medium according to claim 1, wherein the instructions, when executed by the processor, further cause the information processing device to perform:
determining that the print setting using the print information has been changed when, after an acceptance screen for receiving a user input relating to the print setting using the print information is displayed, the information processing device receives a user input for terminating displaying the acceptance screen,
wherein the first connection confirmation process is not executed until the condition for starting the second print preview display process is satisfied, even when the information processing device receives the user input relating to the print setting using the print information, and
wherein the first connection confirmation process is executed in a case that the condition for starting the second print preview display process is satisfied when the information processing device receives the user input relating to the print setting using the print information.

6. The non-transitory computer-readable storage medium according to claim 1, wherein the instructions further cause the information processing device to perform:
executing a second connection confirmation process of confirming, when the instructions are activated by the information processing device, that the connection to the printing device is established,
wherein the first connection confirmation process is not executed in a case that the condition for starting the second print preview display process is satisfied for a first time after the second connection confirmation process has been executed, and
wherein the first connection confirmation process is executed in a case that the condition for starting the second print preview display process is satisfied for a second time after the second connection confirmation process has been executed.

7. The non-transitory computer-readable storage medium according to claim 6, wherein in the second confirmation process, it is determined that the connection to the identified printing device is established when connection confirmation information sent by the identified printing device has been received via the communication interface.

8. The non-transitory computer-readable storage medium according to claim 7, wherein the second confirmation process comprises:
acquiring the identifying information from the storage unit; and
sending instruction information to the identified printing device using the acquired identifying information, the instruction information requesting the identified printing device to send the connection confirmation information to the information processing device.

9. The non-transitory computer-readable storage medium according to claim 1, wherein the instructions further cause the information processing device to perform:
executing second connection confirmation process of confirming, when the identifying information is stored in the storage unit, that the connection to the printing device is established,
wherein the first connection confirmation process is not executed in a case that the condition for starting the second print preview display process is satisfied for a first time after the second connection confirmation process has been executed, and
wherein the first connection confirmation process is executed in a case that the condition for starting the second print preview display process is satisfied for a second time after the second connection confirmation process has been executed.

10. The non-transitory computer-readable storage medium according to claim 9, wherein in the second confirmation process, it is determined that the connection to the identified printing device is established when connection confirmation information sent by the identified printing device has been received via the communication interface.

11. The non-transitory computer-readable storage medium according to claim 10, wherein the second confirmation process comprises:
acquiring the identifying information from the storage unit; and
sending instruction information to the identified printing device using the acquired identifying information, the instruction information requesting the identified printing device to send the connection confirmation information to the information processing device.

12. The non-transitory computer-readable storage medium according to claim 1, wherein the instructions further cause the information processing device to perform:
executing the first connection confirmation process and the first print preview display process in parallel in a case that a condition for starting the first print preview display process is satisfied, and
executing the first print preview display process includes:
displaying display information and the first print preview image on the display unit when connection confirmation information sent by the printing device has been received and when the reception confirmation image is displayed,
the display information indicating the printing device as a source of the connection confirmation information, and
the print preview image being displayed by the print preview display process.

13. The non-transitory computer-readable storage medium according to claim 1, wherein the displaying of the reception confirmation image includes:
displaying, on the display unit, information indicating the printing device and the first print preview image, in a case that connection confirmation information sent by the printing device has been received via the communication interface.

14. The non-transitory computer-readable storage medium according to claim 1, wherein the displaying of the reception confirmation image includes:
displaying the reception confirmation image while the first print preview display process or the second print preview display process is being performed, in a case that connection confirmation information sent by the printing device has been received via the communication interface, the reception confirmation image indicating that the information processing device is ready to accept the user input instructing to send the print information.

15. The non-transitory computer-readable storage medium according to claim 1, wherein in the first connection confirmation process, it is determined that the connection to the identified printing device is established when connection confirmation information sent by the identified printing device has been received via the communication interface.

16. The non-transitory computer-readable storage medium according to claim 15, wherein the first connection confirmation process comprises:
acquiring the identifying information from the storage unit; and
sending instruction information to the identified printing device using the acquired identifying information, the instruction information requesting the identified printing device to send the connection confirmation information to the information processing device.

17. The non-transitory computer-readable storage medium according to claim 1, wherein
the first print preview image and the second print preview image include a print button image and a setting screen button image,
the sending of the print information to the printing device is executed when the print button image is selected,
the instructions, when executed by the processor, further cause the information processing device to perform:
displaying a first setting screen on the display unit when the setting screen button is selected, the first setting screen including a print setting button for changing the print setting and a back button for displaying the second print preview image on the display unit; and
changing the print setting when the print setting button is selected,
the regenerating of the second print preview image and the executing of the first connection confirmation process are performed when the back button is selected and the print setting is changed, and
the regenerated second print preview image includes an image showing a result of the first connection confirmation process.

18. The non-transitory computer-readable storage medium according to claim 17, wherein the first connection confirmation process includes communicating with the printing device when the back button is selected and when it is necessary to execute communication with the printing device regarding the changed print setting.

19. The non-transitory computer-readable storage medium according to claim 1, wherein the setting is for a communication path to be used by the communication interface to send the print information to the printing device.

20. The non-transitory computer-readable storage medium according to claim 19, wherein
the instructions, when executed by the processor, further cause the information processing device to perform:
displaying a first image and a second image on the display unit when the first connection confirmation process is failed, the first image being for accepting an instruction for re-setting of the communication path, and the second image being for accepting an instruction for maintaining a status quo; and
displaying a second setting screen for changing the setting of the communication path on the display unit when the first image is selected,
the first connection confirmation process is performed when the setting of the communication path is changed by using the second setting screen, and
the executing of the second print preview display process is performed when the second image is selected.

21. An information processing device configured to send print information to a printing device connected with a network,
the information processing device comprising:
a communication interface configured to communicate with the network;
a control device coupled to the communication interface; and
a storage unit,
the control device configured to perform:
storing, in the storage unit, identifying information for identifying a printing device connected with the network;
executing a first print preview display process comprising displaying, on a display unit, a first print preview image showing a print preview using the print information according to determining the print information among a plurality of image information;
executing, after the first print preview display process, a second print preview display process comprising displaying, on the display unit, a second print preview image according to a condition for starting the second print preview display process;
sending, after the first print preview display process or the second print preview display process is executed, the print information to the printing device via the communication interface according to a user input instructing to send the print information;
executing a first connection confirmation process comprising confirming that a connection to the printing device is established, the printing device being identified by the identifying information, the first connection confirmation process being executed in a case that:
the condition for starting the second print preview display process is satisfied; and
a print setting using the print information is changed; and
displaying, on the display unit, a reception confirmation image in a case that it is confirmed that the connection to the printing device is established,
wherein the second print preview display process comprises:
regenerating the second print preview image according to the print setting having been changed; and
displaying the regenerated second print preview image on the display unit,
wherein the regenerating the second print preview image, the executing the first connection confirmation process, and the displaying the regenerated second print preview image are performed when it is necessary to regenerate the second print preview image according to the print setting having been changed,
the executing the second print preview display process is performed when it is not necessary to regenerate the second print preview image, and
the regenerating the second print preview image and the executing the first connection confirmation process are performed in parallel.

22. A method for controlling an information processing device configured to send print information to a printing device connected with a network,
the information processing device comprising:
a communication interface configured to communicate with the network;
a control device coupled to the communication interface; and a storage unit, the method comprising:

- storing, in the storage unit, identifying information for identifying a printing device connected with the network;
- executing a first print preview display process comprising displaying, on a display unit, a first print preview image showing a print preview using the print information according to determining the print information among a plurality of image information;
- executing, after the first print preview display process, a second print preview display process comprising displaying, on the display unit, a second print preview image according to a condition for starting the second print preview display process;
- sending, after the first print preview display process or the second print preview display process is executed, the print information to the printing device via the communication interface according to a user input instructing to send the print information;
- executing a first connection confirmation process comprising confirming that a connection to the printing device is established, the printing device being identified by the identifying information, the first connection confirmation process being executed in a case that:
  - the condition for starting the second print preview display process is satisfied; and
  - a print setting using the print information is changed; and
- displaying, on the display unit, a reception confirmation image in a case that it is confirmed that the connection to the printing device is established, wherein the second print preview display process comprises:
- regenerating the second print preview image according to the print setting having been changed; and
- displaying the regenerated second print preview image on the display unit, wherein the regenerating the second print preview image, the executing the first connection confirmation process, and the displaying the regenerated second print preview image are performed when it is necessary to regenerate the second print preview image according to the print setting having been changed, the executing the second print preview display process is performed when it is not necessary to regenerate the second print preview image, and the regenerating the second print preview image and the executing the first connection confirmation process are performed in parallel.

* * * * *